United States Patent
Kashai

(10) Patent No.: US 8,478,575 B1
(45) Date of Patent: Jul. 2, 2013

(54) AUTOMATIC ANOMALY DETECTION FOR HW DEBUG

(75) Inventor: Yaron Kashai, Sunnyvale, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 418 days.

(21) Appl. No.: 12/824,066

(22) Filed: Jun. 25, 2010

(51) Int. Cl.
- *G06F 17/50* (2006.01)
- *G06F 11/30* (2006.01)
- *G06G 7/48* (2006.01)
- *G21C 17/00* (2006.01)
- *G01R 31/28* (2006.01)

(52) U.S. Cl.
USPC ................. 703/14; 703/4; 703/13; 702/185; 714/724

(58) Field of Classification Search
USPC ................. 703/14, 4, 13; 702/185; 714/724
See application file for complete search history.

(56) References Cited

U.S. PATENT DOCUMENTS

| | | | | |
|---|---|---|---|---|
| 6,141,630 | A * | 10/2000 | McNamara et al. | 703/14 |
| 2002/0120891 | A1 * | 8/2002 | Bartenstein et al. | 714/724 |
| 2006/0111873 | A1 * | 5/2006 | Huang et al. | 702/185 |
| 2007/0234161 | A1 * | 10/2007 | Blanton et al. | 714/736 |

OTHER PUBLICATIONS

Baah, George K. et al., "On-line Anomaly Detection of Deployed Software: A Statistical Machine Learning Approach," SOQUA06, Nov. 6, 2006, Portland, OR, USA.

Hangal, Sudheendra et al., "Tracking Down Software Bugs Using Automatic Anomaly Detection," 24th Conference on Software Engineering (ICSE '02) 2002, p. 291.

Teuvo Kohonen, Timo Honkela, Kohonen network, 2007, Scholarpedia, 2(1):1568.

Kraskov, Alexander et al., "Hierarchical Clustering Based on Mutual Information," John-von-Neumann Institute of Computing, Julich, Germany, 2008.

OVM World, Open Verification Methodology, found online on Sep. 24, 2010 at http://www.ovmworld.org/, 1 page.

* cited by examiner

*Primary Examiner* — Omar Fernandez Rivas
*Assistant Examiner* — Angel Calle
(74) *Attorney, Agent, or Firm* — Holland & Knight LLP; Mark H. Whittenberger, Esq.

(57) ABSTRACT

A method for identifying an anomaly in an electronic system includes receiving, from a computer-readable storage medium, a plurality of entries from a successful simulation test of the electronic system, each of the plurality of entries including information about simulation time. The method also includes, with one or more computer processors, determining time sequence relationship between pairs of entries selected from the plurality of entries and identifying allowable sequences of entries using information related to the first plurality of entries and the time sequence relationship. The method includes receiving a second plurality of entries from a failed simulation test of the electronic system, each of the second plurality of entries including information about simulation time. The method includes analyzing the second plurality of entries and identifying one or more anomalies in the electronic system based on the analysis of the failed simulation test.

23 Claims, 9 Drawing Sheets

AUTOMATIC ANOMALY DETECTION FOR HW DEBUG

BACKGROUND OF THE INVENTION

The present invention relates generally to design automation tools in electronic system design. More particularly, some embodiments of the invention provide methods and systems for automatic analysis of simulation test results for detection of anomalies in an electronic system.

As electronic system become more complex, the cost of design and testing continues to rise. As a result, design automation tools are becoming indispensible in electronic system designs. In an automatic design environment, simulation tools allow fast design and testing. Many design and testing activities are carried out in regression environments, which often execute large numbers of simulations overnight. A single simulation of a complex system can generate many mega-bytes of data in waveforms and log files. Such large number of simulation runs typically result in some failures that need to be classified and debugged efficiently.

The debug process is time critical, because it gates the fixes that need to take place before the next regression run. Letting known problems persist for the next regression run aggravates the problem, as the known failures need to be separated out before the new failures can be attended to. On the other hand, debug is a difficult and time consuming intellectual activity that requires a level of expertise. In a conventional design environment, debugging is usually carried out manually. The first action the human debugger performs is scanning through this myriad of data in search of a hint that will narrow down the scope of the problem. The ongoing regression process ties up valuable engineering resources in a constant loop of classification, debug, fix, and repeat.

Hence, methods and systems that can automate the debugging process are of great interest.

BRIEF SUMMARY OF THE INVENTION

In a conventional design environment, debugging of failed tests is a manual and time consuming process. In this environment, data produced by passing simulations is mostly ignored. Embodiments of the invention provide methods and systems for automatically identifying an anomaly in an electronic system. Some embodiments of the invention provide capabilities to automatically detect "good" behavior patterns from passing runs and point out where failing runs diverge. By providing a better starting point for debug, the design process can be made more efficient.

Some embodiments of the present invention provide a method for identifying an anomaly in an electronic system. The method can be used in an analysis tool implemented in a computer system having one or more computer processors and a computer-readable storage medium. The method includes receiving, from the computer-readable storage medium, a plurality of entries from a successful simulation test of the electronic system, each of the plurality of entries includes at least information about simulation time. In an embodiment, the simulation time is the time during simulation when the entry was reported. In certain embodiments, each entry also has a source, which is the element in the simulation that is identified by the entry. The method also includes determining, with one or more of the computer processors, time sequence relationship between pairs of entries selected from the plurality of entries, and identifying, with one or more of the computer processors, allowable sequences of entries using information related to the first plurality of entries and the time sequence relationship.

When used in analyzing a failed test, the method includes receiving, from the computer-readable storage medium, a second plurality of entries from a failed simulation test of the electronic system, each of the second plurality of entries includes at least information about simulation time. The second plurality of entries from the failed simulation test is analyzed, with one or more of the computer processors, based on information related to the first plurality of entries and the allowable sequences from the successful simulation test. The method further includes identifying, with one or more of the computer processors, one or more anomalies in the electronic system based on the analysis of the failed simulation test.

In some embodiments, the allowable time sequences can include hierarchical structures of event entries. In specific embodiment of the above method, determining time sequence relationship includes forming a first plurality of entry classes, each of which represents a subset of the first plurality of entries that have a common feature. A set of allowed patterns are then formed. Some of the allowed patterns include only first-level patterns. Other allowable patterns can include higher levels of patterns. In an embodiment, the set of allowable patterns can include at least a plurality of first-level behavioral patterns and a plurality of second-level behavioral patterns. Each of the first-level behavioral patterns includes information related to two entry classes. Each of the second-level behavioral patterns includes information related to more than two entry classes and, in some cases, includes information related to two or more first-level behavioral patterns. Time sequence relationship between entry classes in each of the allowed patterns is then determined.

In another embodiment, a computer system is provided for performing various methods for identifying an anomaly in an electronic system.

In yet another embodiment, a computer readable storage medium includes computer code which, when retrieved and executed, results in performing various methods for identifying an anomaly in an electronic system.

A further understanding of the nature and advantages of the present invention may be realized by reference to the remaining portions of the specification and the drawings.

DETAILED DESCRIPTION OF THE INVENTION

Figure 1:
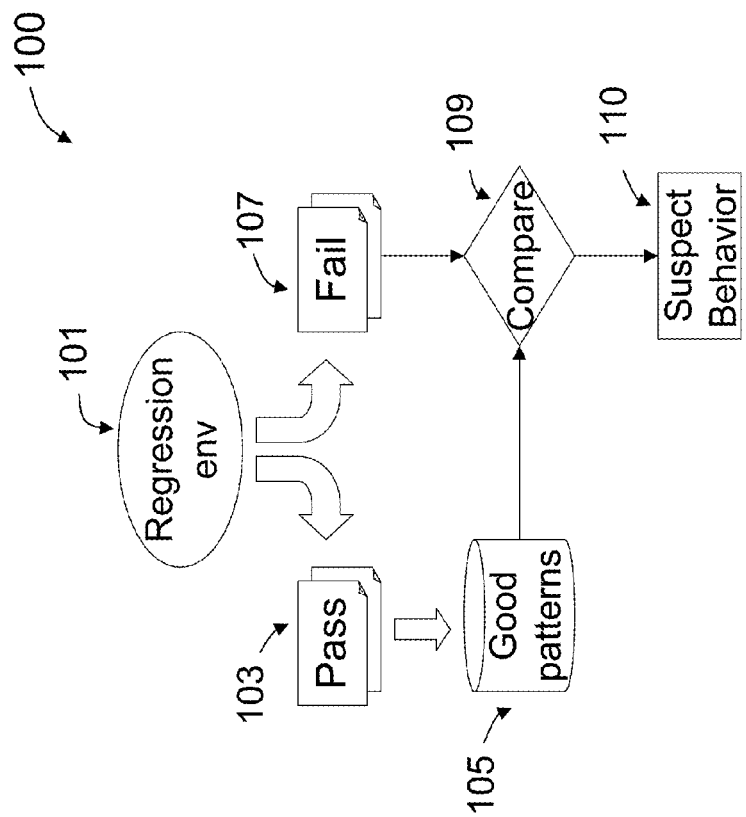
FIG. 1 is a block diagram illustrating a method for automatic anomaly detection according to an embodiment of the present invention.

FIG. 1 is a simplified block diagram illustrating a method for detecting an anomaly in an electronic system according to an embodiment of the invention. In FIG. 1, in a regression test environment 101, identification of "good" behavior 105 of the design under verification can be achieved by automatically scanning the log files and/or waveform traces of passing or successful runs (103). The method also includes analyzing and comparing (109) data left by a run known to fail (107) to identify such good or "allowed" behavioral patterns. In some cases, partial matches, suspect behaviors, and other deviations are reported (110).

Figure 2:
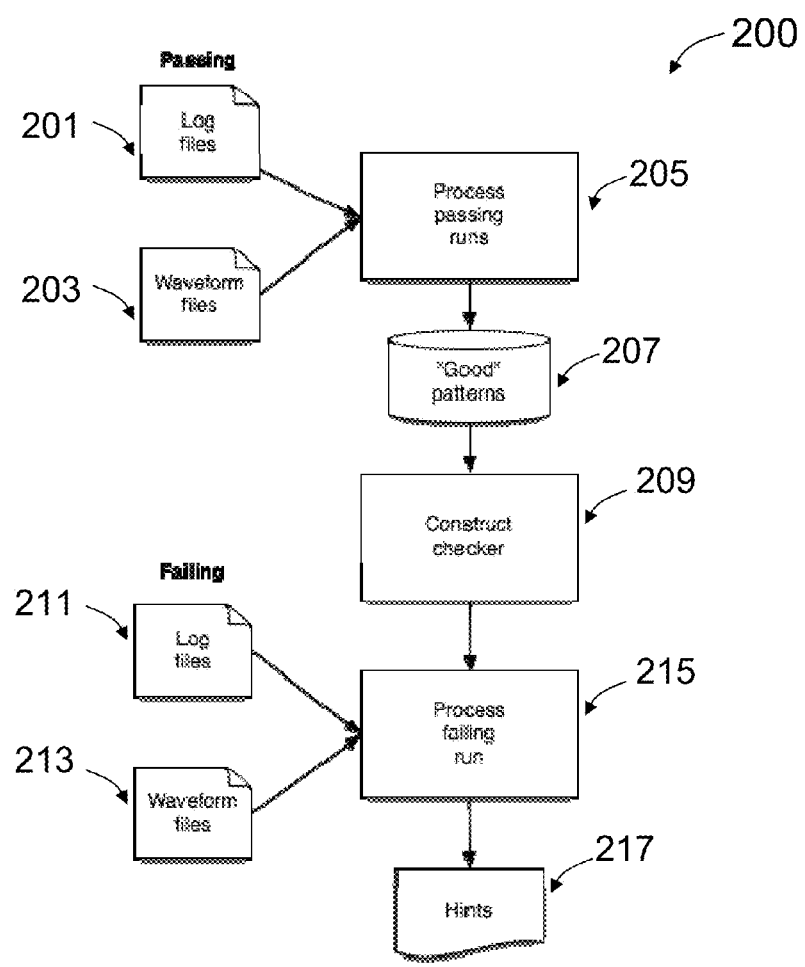
FIG. 2 is a flow diagram illustrating a more detailed method according to an embodiment of the invention.

FIG. 2 is a flow diagram illustrating a more detailed method according to an embodiment of the invention. As shown in FIG. 2, the information, e.g., run logs 201 and/or waver form files 203, left by passing runs 205 is extracted and formed into behavioral patterns 207. In this embodiment, these patterns can be statistical in nature, each assigned a relevance number describing how likely it is to show up in a passing run. This database of passing run behavior patterns can be accumulated over a suite of runs. Patterns can be composed recursively to create a hierarchy, reflecting the natural semantics of the logged information. Patterns can also be filtered so that the most likely behaviors are identified. Each pattern is qualified in terms of its likelihood and its average temporal occurrences (when does it tend to occur, at what relative time each member of the pattern is expected to show, its typical and maximal duration and so on). The final pattern database is processed and converted into a checker 209.

In a specific example, checker 209 is a timed tree automaton, where each node represents a position in a pattern (e.g., a position in a family of patterns sharing a common prefix). Each edge of the tree represents a possible legal transition, which is qualified with average and maximal time as well as a probability.

Given a failing run, it's outputs (e.g., log files 211 and/or waveforms 213) are processed (in 215) by checker 209, which may identify a large number of patterns that correspond to normal behavior. It may, however, spot some anomalies, for example:
  Some patterns that occur in every passing run may be missing;
  Some patterns may be partially detected, for example they may start but not finish;
  Some behavior will be completely new.

The checker will report such anomalies (217), after qualifying them based on their probability, and after filtering out ones that seem less interesting given the general nature of hardware simulation. The output of the process is a list of hints that point the human debugger to anomalies in the failing simulation outputs. Such anomalies can be extremely hard to spot by simply scanning the output by eye because of the huge size of the output and the fact that behavior patterns intertwine due to concurrent execution, obscuring each orthogonal behavior pattern.

In some embodiments, hardware designs, such as digital systems, can give rise to hierarchical patterns that are exposed by pattern extraction algorithms. Hardware designs also can exhibit rich concurrent and timing related behaviors. In addition, embodiments of the invention also include the integration of multiple sources of run trace information.

In some embodiments, automatic design anomaly detection can include one or more the following processes:

Automatic extraction of expected behavior patterns from a suite of passing simulation runs;
  Construction of a checker from the identified patterns;
  Application of the checker to a failing run, and outputting a list of hints.

Figure 3:
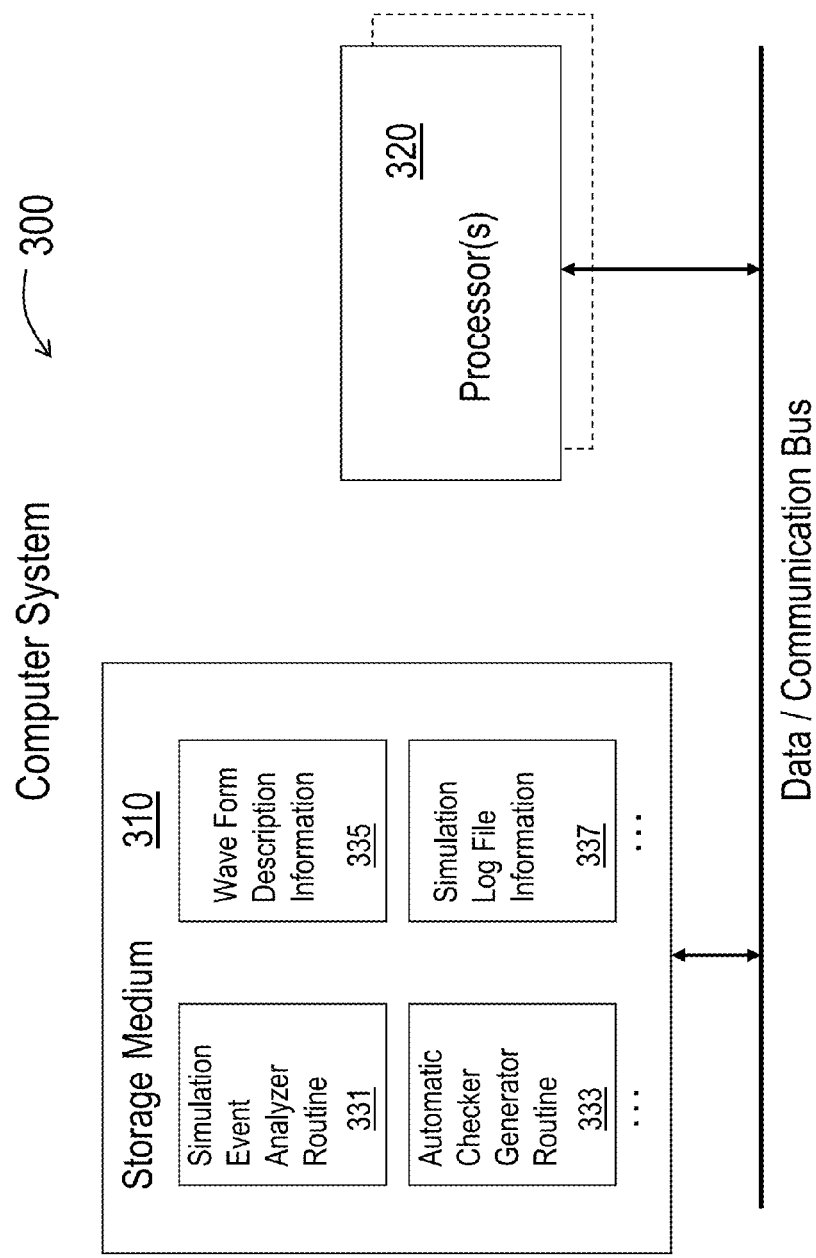
FIG. 3 is a simplified block diagram of a computer system that can be used for performing automatic anomaly detection according to an embodiment of the present invention.

FIG. 3 is a simplified block diagram of a computer system 300 that can be used for performing automatic anomaly detection according to embodiments of the present invention. As shown, computer system 300 includes a storage medium 310 and one or more processors 320 coupled to storage medium 310 through a data/communication bus. Depending on the embodiment, processor 320 may include a single processor, multiple processors, or a number of local or distributed processors operating in parallel. Storage medium 310 can include various memory and mass storage devices, such as DRAM, SRAM, non-volatile memory devices, read only memory (ROM), disk storage, optical CD, DVD, etc. Storage medium 310 are configured to store one or more computer instruction codes and data, while processor 320 is configured to retrieve the code and data, and to execute the computer code. In the embodiment of FIG. 2, storage medium 310 includes computer codes such as simulation event analyzer routine 331 and automatic checker generator routine 333. Storage medium 310 also includes various data files, such as wave form description information 335 and circuit simulation log file information 337.

Figure 4:
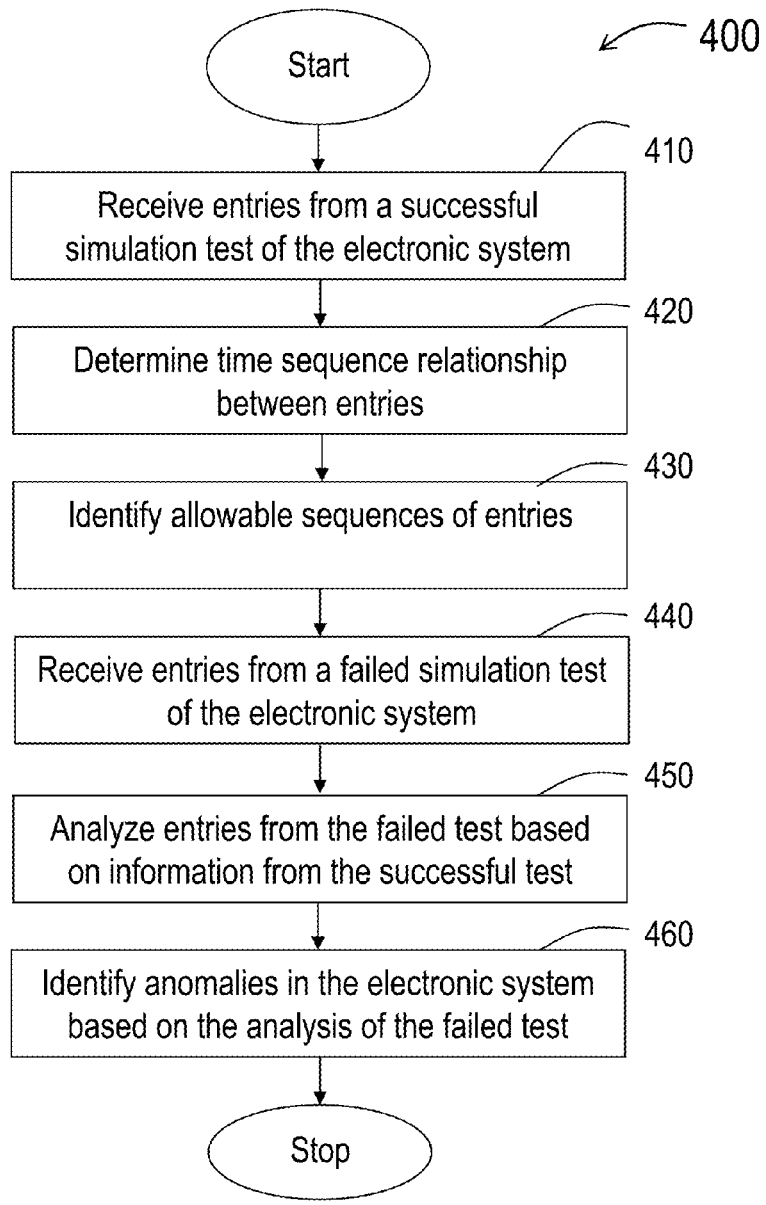
FIG. 4 is an example of waveforms according to an embodiment of the invention.

In some embodiments, when computer program instructions or code are retrieved from storage medium 310 and executed by processor(s) 320, certain automatic anomaly checking functions are performed. For example, in an embodiment, a method is carried out for identifying one or more anomalies in an electronic system. The method is outlined in flowchart 400 in FIG. 4, and summarized below.

Step 410—Receive, from the computer-readable storage medium, a plurality of entries from a successful simulation test of the electronic system, each of the plurality of entries including at least information about simulation time;
  Step 420—Determine, with one or more of the computer processors, time sequence relationship between pairs of entries selected from the plurality of entries;
  Step 430—Identify, with one or more of the computer processors, allowable sequences of entries using information related to the first plurality of entries and the time sequence relationship;
  Step 440—Receive, from the computer-readable storage medium, a second plurality of entries from a failed simulation test of the electronic system, each of the second plurality of entries including at least information about simulation time;
  Step 450—Analyze, with one or more of the computer processors, the second plurality of entries from the failed simulation test based on information related to the first plurality of entries and the allowable sequences from the successful simulation test; and
  Step 460—Identify, with one or more of the computer processors, one or more anomalies in the electronic system based on the analysis of the failed simulation test.

Certain features of the methods and systems for analyzing and identifying anomalies in an electronic system are first described below. They will be further illustrated using specific examples subsequently.

In some embodiments, hierarchical patterns are recognized. This can be illustrated using entry classes and two level of behavioral patterns, although multiple levels of patterns are also included. Here, determining time sequence relationship includes forming a first plurality of entry classes, each of which represents a subset of the first plurality of entries that have a common feature. A set of allowed patterns are then formed. Some of the allowed patterns include only first-level patterns, and other allowable patterns can include higher levels of patterns. In an embodiment, the set of allowable patterns can include at least a plurality of first-level behavioral patterns and a plurality of second-level behavioral patterns. Each of the first-level behavioral patterns includes information related to two or more entry classes. Each of the second-level behavioral patterns includes information related to more than two entry classes and, in some cases, includes information related to two or more first-level behavioral patterns. Time sequence relationship between entry classes in each of the allowed patterns is then determined.

In a specific embodiment, the process of identifying allowable sequences of entries also includes identifying allowable sequences of entry classes using information related to the first plurality of entry classes, the set of allowed patterns, and the time sequence relationship.

In an embodiment, the set of allowed patterns and the allowable time sequence relationship are implemented in an bottom-up automata.

In an embodiment, the process of analyzing the second plurality of entries from the failed simulation test includes forming a second plurality of entry classes, each of which represents a subset of the second plurality of entries that have a common feature. The process also includes analyzing the second plurality of entry classes from the failed simulation test based on information related to the first plurality of entry classes, the set of allowed patterns, and allowable sequences from the successful simulation test. In an example, identifying allowable sequences of entries includes incorporating the allowable sequences in a bottom-up automata.

In some embodiments, the method also includes outputting anomaly information related to the anomalies using a computer display device. In some cases, the output includes hints to aid the user in debugging. In certain embodiments, the anomaly information may include one or more of the following:
  missing patterns;
  new patterns;
  a list of stuck patterns or partial patterns—patterns that have started and not finished—and a prediction of how they should finish; and
  a list of timing anomalies or a list of patterns with suspect timing, detected by comparing the timing to the average timing characteristics of the pattern.

The method described above is now illustrated with more detailed examples.

Deriving Behavioral Patterns

Figure 5:
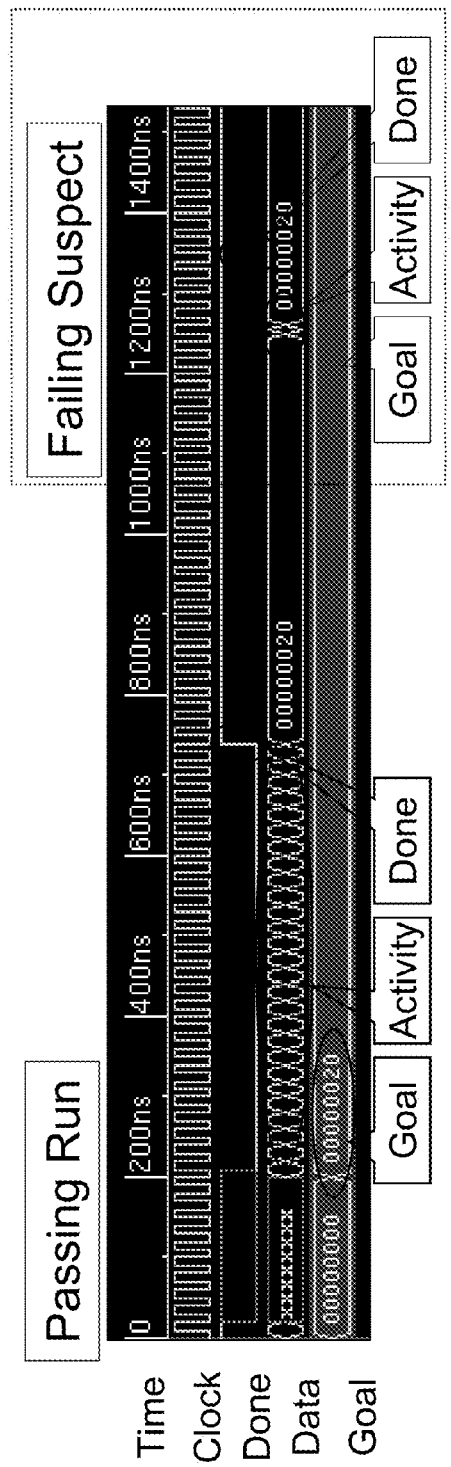
FIG. 5 is an example of log messages according to an embodiment of the invention.
Figure 6:
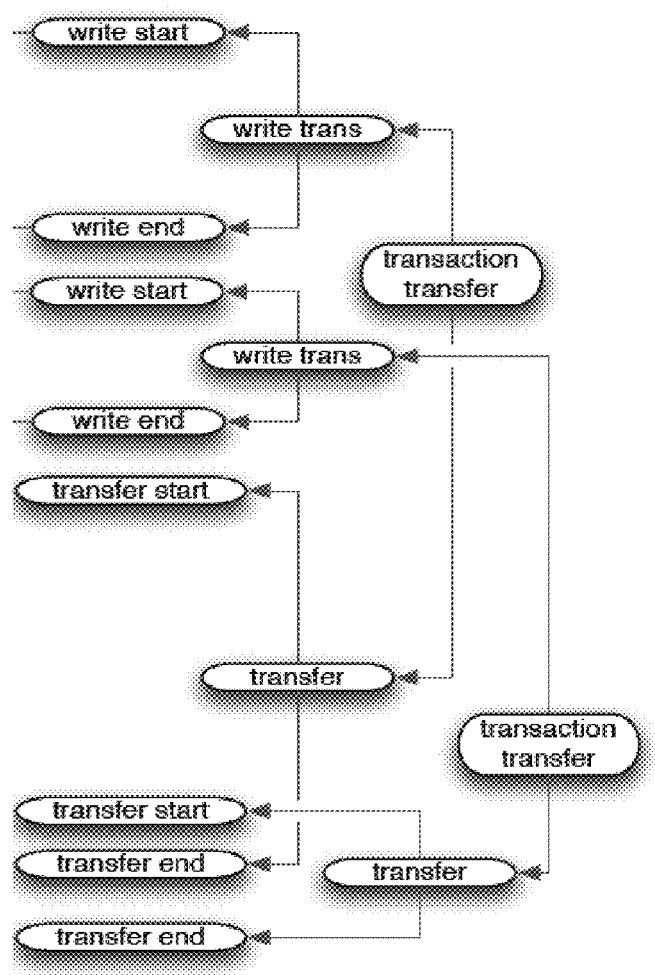
FIG. 6 is a simplified diagram illustrating sequence graph according to an embodiment of the present invention.

In some embodiments, two input sources are used in an environment of electronic design: log messages and waveforms. However, the methods considered here can be extended to deal with other inputs, for example, transaction recordings. FIG. 5 is an example of waveforms according to an embodiment of the invention. Waveforms are database entries that can contain signal names, transition times, and values. The signals in FIG. 5 include run time, the clock signal, the data signal, the "Done" status signal, and Goal values. The left side of FIG. 5 illustrates a passing run, which includes data signals representing activities, goal values being met, and the presence of the "Done" status signal. In contrast, the right side of FIG. 5 shows a suspected failing run, with an absence of the "Done" status signal and unmatched goal values. FIG. 6 is an example of event extraction based on log messages according to an embodiment of the invention. Here, the basic operations of the design under verification include "write start," "write end," "transfer start," and "transfer end," etc. Further details of hierarchical event extraction is described below.

In an embodiment, the inputs from the successful runs are parsed and represented internally in structures called entries which are tuples of features. For log messages, the represented features include the simulation time, the message text string, values of parameters such as integers and data references, as well as the identity of the unit that printed the message, which is considered the source of the entry. For waveforms, the represented features include the simulation time, the value and the hierarchical path of the signal, considered the source of the entry. Each entry also identifies the run from which it is derived and the sequential order of the entry in that run.

A population of heterogeneous entries is accumulated as a number of passing runs is processed. This population is processed into patterns by a pattern extraction algorithm, which includes iterating n times the following steps:
  I. Classify entries into equivalence classes. Each equivalence class contains entries that are uniformly structured (same feature set) and have the same source.
  II. Cluster entries based on their feature vectors. Exit if no new clusters are formed. (More about clustering below).
  III. Create new entries from the clusters, the feature vector of each new entry is the union of its members feature vectors.

The above algorithm is iterated a pre-determined number of times, or quits when no clusters are formed in step (II).

As mentioned above, FIG. 6 illustrates an example of hierarchical pattern extraction using a log file according to an embodiment of the invention. The initial set of entries, which are not shown in FIG. 6, reflect some simple behavior in the design under verification, for example read and write transactions on some bus. The features of an entry may identify the data packet or the address being accessed. These values may not be used directly in the extraction algorithm, but may indicate the identity of the feature when comparing with other entries. Additionally, the features may include the source and destination units.

In an embodiment, an algorithm for identifying hierarchical patterns of entry or entry class include the following steps.
  Step (1) will collect all write start entries with the same source into an equivalence class and will similarly collect all write end entries into another equivalence class;
  Step (2) will create clusters of size 2 joining each write start entry with its matching write end entry—presumably using the address reference as the unifying feature;
  Step (3) will create a new entry from each cluster—such entry will combine the features of the write start and write end entries; and
  Returning to step (1), new equivalence classes will be created for all write transaction entries.

The newly created write transaction equivalence class is a simple pattern—called a first order (or first level) pattern—that can be used for anomaly detection. It may be able to detect cases where a transaction has started but did not end. Running the algorithm another round exposes a richer behavior: the write transaction is followed temporally by entries reporting a transfer, which in itself is a second order (or second level) pattern comprising slave transfer start, slave transfer end, master transfer start and master transfer end. If the correlation is strong enough, a new cluster will be formed yielding entries of the form transaction and transfer, a yet higher order (or higher lever) pattern. Such a high order pattern can be used to detect obscure failures in processing transactions and transfers.

The pattern extraction algorithm recovers a hierarchy of behavior that is often found in hardware design. The high level structure exposed by the patterns is easier for engineers to understand. Looking at the fragments of such high level structures, especially when interleaved with other behavior can often obscure the design behavior and prevents comprehension by a human observer.

Figure 7:
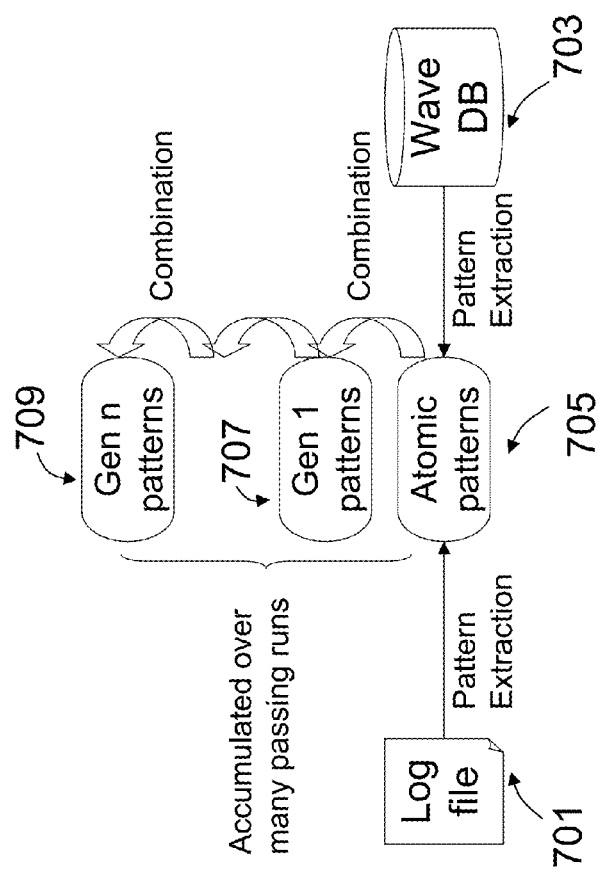
FIG. 7 is a simplified flow diagram illustration a method for behavioral patterns extraction according to an embodiment of the present invention.

FIG. 7 is a simplified flow diagram illustration a method for behavioral patterns extraction according to an embodiment of the present invention. As shown in FIG. 7, the method includes collecting patterns gathered from log files 701 and waveform 703 databases and forming passing patterns. For example, atomic patterns (first-level patterns) 705 can be combined to form generation 1 (Gen 1 or second-level) patterns 707. In some cases, the patterns are compounded recursively, to form Gen n (generation n or higher level) patterns 709. Of course, besides log files and waveform databases, other sources can be used as well.

In some embodiments, behavioral patterns can be extracted from entry data using a clustering method. Embodiments of the invention include various methods for clustering data, ranging from algebraic and statistical methods to unsupervised machine learning. In a specific embodiment, a distance based method is used, in which one or more of the following properties are maintained in order to preserve the semantics of features:

Features are typed—each feature is associated with a data type based on the data represented. Example types include time, sequential order, string, integer, Boolean, reference, path and so on;

Features of different types are incomparable (orthogonal, infinite distance); and Clustering is done for each type independently, possibly using a different clustering method.

When using a distance based method, each data type has an associated metric—a function from a pair of values to a non-negative number. Different metrics are used for different types. Table 1 below lists examples of types and metrics.

TABLE 1

| Type | Metric |
| --- | --- |
| Reference, path | 0 if equal, ∞ otherwise |
| String | Normalized Hamming distance |
| Time, Sequential order | Exponential decay |
| Integer | min(Hamming distance, arithmetic difference) |

In a specific embodiment, behavioral patterns extraction using a distance method can use the procedures described below. Let EQ be the vector of equivalence classes and |EQ| the size of that vector. Let Ind(Eq), Eq∈EQ, be the index of Eq in EQ, and the function Eq(e) return the class Eq such that e∈Eq. Distance between Equivalence classes are stored in adjacency matrices, one matrix per type, denoted $A_T$. Each adjacency matrix is |EQ|×|EQ| in size, is symmetric and has a zero diagonal. Let T(f) be a function returning the type of feature f. Let $D_T(f1,f2)$ be the distance function of type T. The set S is a temporary set of entry tuples.

The procedure Distance(e1, e2) computes the distance between two entries. It is presented here in a simplified form.

Procedure Distance(e1,e2):
For each pair f1, f2 such that f1∈e1, f2∈e2, T(f1)=T(f2)
  i=Ind(Eq(e1)); j=Ind(Eq(e2))
  d=$D_{T(f1)}$(f1,f2)
  If d<τ1 then:
    $A_{T(f1)}[i,j]=A_{T(f1)}[i,j]+d$
    S=S∪(e1, e2)

Better results can be obtained if the accumulation of distances is biased in favor of fewer and closer relations. A biasing factor of the form $k \cdot e^{-d/|Eq1|+|Eq2|}$ is used, where d is the computed distance and k is a parameter controlling amplification.

The procedure unify(i,j) is called to form new clusters, which are represented as sets. Let C be the set of all clusters and C(e) be a function returning all the entries that are clustered together with e.

Procedure Unify(i, j):
For each e1 in EQ[i]
  For each e2 in EQ[j]
    If (e1,e2) ∈ S then C = C ∪ {C(e1), C(e2)}

An example of the algorithm for distance based clustering is as follows:

Initialize all matrices $A_T$=∞
Initialize S=Ø
For each pair Eq1, Eq2∈EQ
For each entry e1 in Eq1 and e2 in Eq2 compute Distance (e1, e2).
For each matrix $A_T$
  For each i, j such that j<i<|$A_T$|
    If $A_T$[i,j]<τ₂ then Unify(i,j)

Locality sensitive hashing can be used to speed up the feature by feature comparison. Two thresholds, τ₁ and τ₂ are used to eliminate noisy data and limit the number of comparisons performed. Filtering may be applied by adapting the thresholds based on the population of features.

Characterizing Equivalence Classes

In some embodiments, characterizing equivalence classes also includes statistical features, which is computed in the pattern extraction process for each pattern, represented by the matching equivalence class. These features are computed over the entries that belong to the equivalence class. Some examples are:

The probability of the pattern to appear in a run

The average number of appearances in a run

The average onset time of the first (and last) pattern in a run

The average duration of a pattern and the standard deviation

The average gap between patterns and the standard deviation

Figure 8:
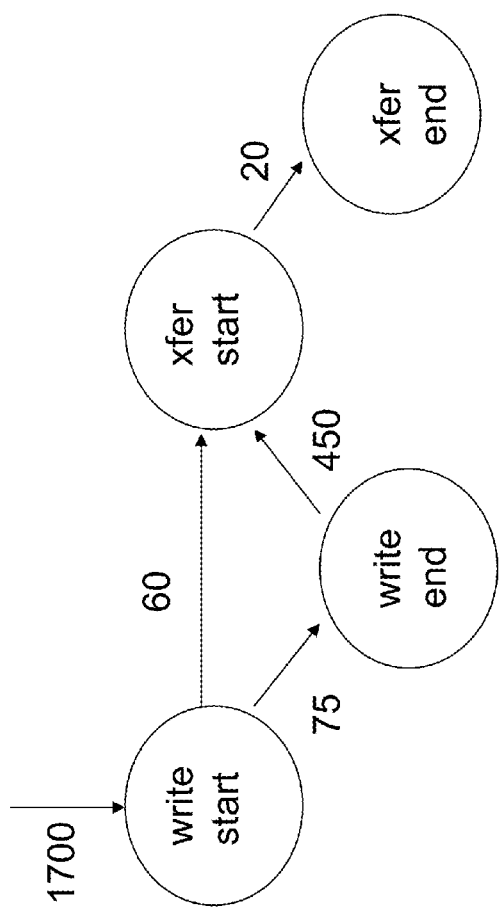
FIG. 8 is a simplified diagram illustrating sequence graph according to an embodiment of the present invention.

In some embodiments, a sequence graph is computed for every compound (non-atomic, or higher-level) pattern. FIG. 8 is a simplified diagram illustrating sequence graph according to an embodiment of the present invention. The graph represents the relationship between equivalence classes included in the pattern, e.g., write start, write end, xfer start, and xfer end, etc., ordered sequentially in the order of sub-entries that make up each member entry, e.g., write start, write end, xfer start, and xfer end, as shown in FIG. 8. This is achieved by sorting the sub-entries by their sequence numbers. If the sequencing order is not uniform, the union of sequence graphs is taken. The graph edges are annotated with the average transition time between nodes, e.g., 1700, 75, 60, 450, and 20, etc, as shown in FIG. 8. In the example of FIG. 8 two ordering variants were found. The statistical features will be used during checking to flag suspect behavior.

Checker Construction

Embodiments of the present invention provide checker generating routines for automatic anomaly detection. The checker routines are software programs that incorporate allowable entries, entries classes, and sequences derived from database of passing tests. In some embodiments, the checker is implemented as a bottom-up finite tree automaton, that may be nondeterministic (ND). (The automaton is ND if sequence graphs with common prefixes exist in EQ).

In an embodiment, tree automata are defined by a tuple: (Q, F, Qf, Δ), where:

Q is a set of states—mapped to the set of known patterns. Reaching a state means the corresponding pattern was recognized;

F is the alphabet, mapped to the atomic entry equivalence classes, ranked by their probability;

$Q_f$, the accepting states, are the subset of top level patterns (patterns that are not part of other patterns); and Δ is the transition relation from patterns to the higher level pattern containing them.

The automaton initial state $q_j$ is explicitly added to Q, and transitions from $q_j$ to each atomic state in Q are added to Δ. Transitions in the tree automaton are annotated by the probability of transition and the average transition time.

In a specific embodiment, a construction algorithm can be defined using several procedures. Let State(exp) return a new unique state identifier. Let Input(Eq), defined for atomic equivalence classes, be the entry type that matches Eq. The predicate top(Eq) returns True for equivalence classes that are not members of other equivalence classes in EQ. Let SequenceEdges(Eq) return the list of edges in the sequence graph of Eq. Let Source(v) and Target(v) return the source and target state of an edge, respectively. In this example, the construction algorithm is implemented as follows:

```
Initialize Q = {q_j}
Initialize Q_f = Ø; Δ = Ø; F = Ø
For each Eq in EQ do:
  Q = Q ∪ State(Eq)
  If Eq is atomic then F = F ∪ Input(Eq)
  If top(Eq) then Q_f = Q_f ∪ State(Eq)
  For each v ∈ SequenceEdges(Eq) do:
    Q = Q ∪ Target(v)
    Δ = Δ ∪ {Source(v), Target(v)}
    v' such that Source(v') = Target(v); If v'¬∈ SequenceEdges(Eq) then :
      Δ = Δ ∪ {Target(v), State(Eq)}/* add final transition */
    v" such that Target(v") = Source(v); If v"¬∈ SequenceEdges(Eq) then :
      Δ = Δ ∪{q_j, Source(v)}       /* add initial transition */
```

Checker Execution

Figure 9:
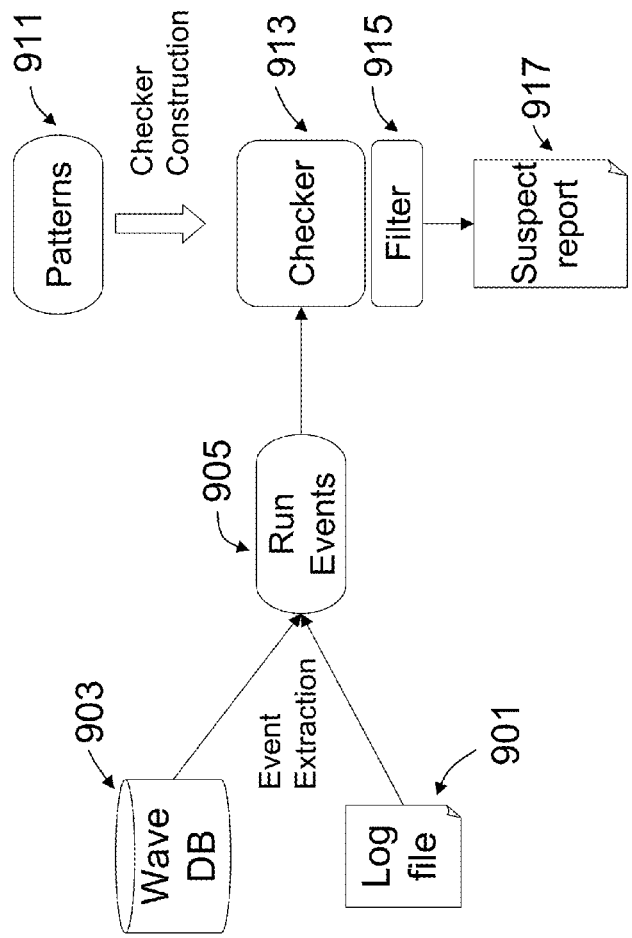
FIG. 9 illustrate a method for automatic anomaly detection according to an embodiment of the invention.

FIG. 9 illustrate a method for automatic anomaly detection according to an embodiment of the invention. In this embodiment, failing run logs 901 and/or waveforms 903 are converted to run events 905, which can include entries and entry classes, in a way similar to the passing runs process. Entries are classified to equivalence classes.

The failing run entries are provided to the checking automaton 913 in sequential order. The automaton implementation includes data from successful runs 911, and is capable of tracking multiple patterns simultaneously: an entry could advance the internal state of one pattern as well as initiate another. These are maintained as a dynamic list of active traces.

When an accepting state is reached, the related active trace is removed. Active traces that get stuck, or exceed a timing threshold determined by transition timing statistics, get reported 917 as potential anomalies. In FIG. 9, an optional filter function 915 is included, which processes output of checker 913 to provide suitable anomaly reports. In an embodiment, new equivalence classes found are reported as anomalies—as they represent behavior that wasn't found in the passing runs.

In embodiments of the invention, nondeterministic transitions in the checker represent variations in the sequential ordering of entries in a pattern. Sometimes a primary order with a high probability overshadows a secondary order with low probability. In those cases the nondeterminism is removed statically by eliminating the low probability transition. In other cases, though, nondeterministic transitions must be retained to prevent significant degradation of the checker. Nondeterminism is handled in runtime by forking the active trace at the point of nondeterminism. When any of the forked traces reaches an accepting state all related traces are removed.

Anomaly Reporting

The checker flags active traces if they get stuck or delayed beyond a threshold that is computed per transition. The checker also flags newly created equivalence classes and equivalence classes that were not present in the run but have a high likelihood. The anomalies are collected and sorted based on their probability. Some of the anomalies include the following:

Missing patterns are reported based on the likelihood of the missing equivalence class;

New patterns are always reported (but see filtering below);

The probability of stuck traces is computed as the weighted sum of probabilities of the accepting states. (the probability of an accepting state is the likelihood of the corresponding equivalence class);

The probability of timing anomalies is computed as the probability of a similar stuck trace times the probability of the timing threshold used.

Since it is desirable for the generated hints to be understood and acted upon by the debugging engineer, a small number of high quality hints is desired. Therefore, the list of hints can be further filtered to eliminate patterns typical to hardware verification failure. For example, error reporting can appear as a new pattern, and such patterns are not reported. As another example, mid run termination due to error is likely to cut patterns mid-execution yielding stuck traces. Such stuck traces are likely caused by the error, rather than causing the error. Hence patterns overlapping the time of error have their probabilities reduced. In some embodiments, a small number of top probability anomalies are selected, and presented in readable form to the debugging engineer. The ability to explore the list of hints interactively, applying searches and manual filters through a user interface are also included in some embodiments of the invention. For example, the integration of user input in both pattern editing and hint ranking through a graphical user interface would improve the over all benefit to the user.

As described above, embodiments of the invention make use of invaluable information about the typical behavior of passing runs which often goes to waste in a conventional debugging environment. The techniques described above uses that information to detect suspicious behavior for a shorter debug cycle. Automatic anomaly detection uncovers and reports suspect behavior of failing simulation runs, by comparing to patterns of behavior extracted from related passing runs.

Such suspect behavior may or may not be directly tied to the reported error. In a successful scenario, such hints may jump over many reasoning steps from the error to the root cause, shrinking the debug process. In a less structured environment, the similarity between passing and failing runs may be hard to establish. It is also noted that automatically detected anomaly hints are based on statistical observations, hence rare but legitimate behaviors may be flagged as anomalies. Additionally, an anomaly may be reported even if there is no causal relation to the failure. In order to handle these situations, embodiments of the invention also provide interactive capabilities. For example, the integration of user input in both pattern editing and hint ranking through a graphical user interface would improve the over all benefit to the user.

While certain embodiments of the invention have been illustrated and described, those skilled in the art with access to the present teachings will recognize that the invention is not limited to these embodiments only. Accordingly, it is to be understood that the invention is intended to cover numerous modifications, changes, variations, substitutions, and equivalents that will be apparent to those skilled in the art.

What is claimed is:

1. A method, implemented in a computer system having one or more computer processors and a computer-readable storage medium, for identifying an anomaly in an electronic system, the method comprising:
   receiving, from the computer-readable storage medium, a first plurality of entries from a successful simulation test of the electronic system, wherein the successful simulation test is a test of the electronic system by simulation that indicates the electronic system passing the test, each of the plurality of entries including at least information about simulation time and information from an output electronic waveform description or an output text log file;
   determining, with one or more of the computer processors, time sequence relationship between pairs of entries selected from the plurality of entries;
   identifying, with one or more of the computer processors, allowable sequences of entries using information related to the first plurality of entries and the time sequence relationship from the successful simulation test, wherein said sequences of entries are referred to as allowable sequences of entries;
   receiving, from the computer-readable storage medium, a second plurality of entries from a failed simulation test of the electronic system, wherein the failed simulation test is a test of the electronic system by simulation that produces results that indicate failures of the electronic system, each of the second plurality of entries including at least information about simulation time and information from an output electronic waveform description or an output text log file;
   analyzing, with one or more of the computer processors, the second plurality of entries from the failed simulation test based on information related to the first plurality of entries and the allowable sequences of entries from the successful simulation test; and
   identifying, with one or more of the computer processors, one or more anomalies in the electronic system based on the analysis of the failed simulation test.

2. The method of claim 1, further comprising receiving a plurality of entries from two or more successful simulation tests of the electronic system.

3. The method of claim 1, wherein determining time sequence relationship comprises:
   forming a first plurality of entry classes, each of which represents a subset of the first plurality of entries that have a common feature;
   forming a set of patterns including at least a plurality of firs-level behavioral patterns, wherein:
   each of the firs-level behavioral patterns includes information related to two or more entry classes; and
   determining time sequence relationship between entry classes in each of the patterns.

4. The method of claim 3, wherein identifying allowable sequences of entries comprises identifying allowable sequences of entry classes using information related to the first plurality of entry classes the set of patterns, and the time sequence relationship.

5. The method of claim 2, wherein analyzing the second plurality of entries from the failed simulation test comprises:
   forming a second plurality of entry classes, each of which represents a subset of the second plurality of entries that have a common feature; and
   analyzing the second plurality of entry classes from the failed simulation test based on information related to the first plurality of entry classes, the set of patterns, and allowable sequences from the successful simulation test.

6. The method of claim 3, wherein the set of patterns further comprises a plurality of second-level behavioral patterns, wherein each of the second-level behavioral patterns includes information related to more than two entry classes.

7. The method of claim 6, wherein one or more of the second-level behavioral patterns include information related to two or more first-level behavioral patterns.

8. The method of claim 1, wherein identifying sequences of entries comprises incorporating the allowable sequences in a bottom-up automata.

9. The method of claim 8, further comprising analyzing the second plurality of entries from the failed simulation test using the bottom-up automata.

10. The method of claim 1, further comprising outputting anomaly information related to the anomalies using a computer display device.

11. The method of claim 10, wherein the anomaly information comprises one or more of the following:
    missing patterns;
    new patterns;
    a list of partial patterns; and
    a list of patterns with suspect timing.

12. A computer system for anomaly detection in an electronic design, the system comprising:
    a non-transitory machine-readable storage medium;
    one or more processors coupled to said storage medium; and
    computer code stored in said storage medium wherein said computer code, when retrieved from said storage medium and executed by said one or more processor, results in:
    receiving, from the computer-readable storage medium, a plurality of entries from a successful simulation test of the electronic system, wherein the successful simulation test is a test of the electronic system by simulation that indicates the electronic system passing the test, and each of the plurality of entries includes at least information about simulation time and information from an output electronic waveform description or an output text log file;
    determining, with one or more of the computer processors, time sequence relationship between pairs of entries selected from the plurality of entries;
    identifying, with one or more of the computer processors, allowable sequences of entries using information related to the first plurality of entries and the time sequence relationship from the successful simulation test, wherein said sequences of entries are referred to as allowable sequences of entries;
    receiving, from the computer-readable storage medium, a second plurality of entries from a failed simulation test of the electronic system, wherein the failed simulation test is a test of the electronic system by simulation that produces results that indicate failures of the electronic system, each of the second plurality of entries includes at least information about simulation time and information from an output electronic waveform description or an output text log file;

analyzing, with one or more of the computer processors, the second plurality of entries from the failed simulation test based on information related to the first plurality of entries and the allowable sequences from the successful simulation test; and identifying, with one or more of the computer processors, one or more anomalies in the electronic system based on the analysis of the failed simulation test.

13. The computer system of claim 12, further comprising receiving a plurality of entries from two or more successful simulation tests of the electronic system.

14. The computer system of claim 12, wherein determining time sequence relationship comprises:

forming a first plurality of entry classes, each of which represents a subset of the first plurality of entries that have a common feature;

forming a set of hierarchical patterns from the first plurality of entry classes; and determining time sequence relationship in each of the hierarchical patterns.

15. The computer system of claim 14, wherein forming a set of hierarchical patterns comprises:

forming a set of patterns including at least a plurality of first-level behavioral patterns, wherein:

Each of the first-level behavioral patterns includes information related to two entry classes.

16. The computer system of claim 15, wherein the set of patterns further comprises a plurality of second-level behavioral patterns, wherein each of the second-level behavioral patterns includes information related to more than two entry classes.

17. The computer system of claim 16, wherein one or more of the second-level behavioral patterns include information related to two or more first-level behavioral patterns.

18. A non-transitory machine-readable storage medium comprising computer code stored in said non-transitory machine-readable storage medium, wherein said computer code, when retrieved from said non-transitory machine-readable storage medium and executed by a processor, results in:

receiving, from the non-transitory machine-readable storage medium, a plurality of entries from a successful simulation test of the electronic system, wherein the successful simulation test is a test of the electronic system by simulation that indicates the electronic system passing the test, each of the plurality of entries includes at least information about simulation time and information from simulation output;

determining, with one or more of the computer processors, time sequence relationship between pairs of entries selected from the plurality of entries;

identifying, with one or more of the computer processors, allowable sequences of entries using information related to the first plurality of entries and the time sequence relationship;

receiving, from the non-transitory machine-readable storage medium, a second plurality of entries from a failed simulation test of the electronic system, wherein the failed simulation test is a test of the electronic system by simulation that produces results that indicate failures of the electronic system, each of the second plurality of entries includes at least information about simulation time and information from simulation output;

analyzing, with one or more of the computer processors, the second plurality of entries from the failed simulation test based on information related to the first plurality of entries and the allowable sequences from the successful simulation test; and identifying, with one or more of the computer processors, one or more anomalies in the electronic system based on the analysis of the failed simulation test.

19. The non-transitory machine-readable storage medium of claim 18, wherein each of the plurality of entries from a successful simulation test of the electronic system comprises information from an electronic waveform description or a text log file.

20. The non-transitory machine-readable storage medium of claim 18, further comprising receiving a plurality of entries from two or more successful simulation tests of the electronic system.

21. The non-transitory machine-readable storage medium of claim 18, wherein determining time sequence relationship comprises:

forming a first plurality of entry classes, each of which represents a subset of the first plurality of entries that have a common feature;

forming a set of hierarchical patterns; and determining time sequence relationship in each of the hierarchical patterns.

22. The non-transitory machine-readable storage medium of claim 21, wherein forming the set of hierarchical patterns comprises:

forming a set of patterns including at least a plurality of first-level behavioral patterns and a plurality of second-level behavioral patterns wherein:

each of the first-level behavioral patterns includes information related to two entry classes; and each of the second-level behavioral patterns includes information related to more than two entry classes.

23. The non-transitory machine-readable storage medium of claim 22, wherein one or more of the second-level behavioral patterns include information related to two or more first-level behavioral patterns.

* * * * *